(No Model.)
M. E. BURLINGAME.
FETTER FOR ANIMALS.
No. 298,551.  Patented May 13, 1884.
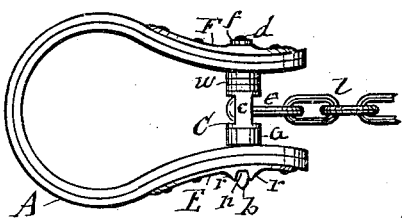
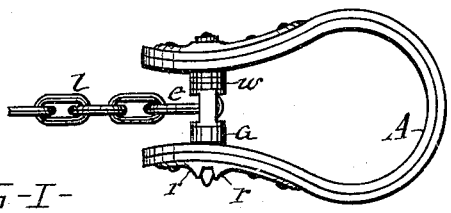
FIG-I-
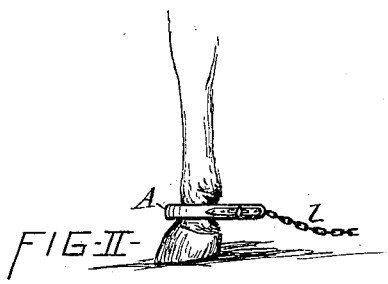
FIG-II-
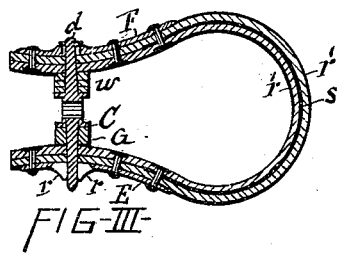
FIG-III-
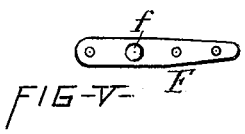
FIG-V-
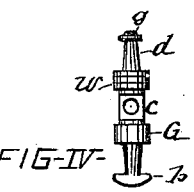
FIG-IV-
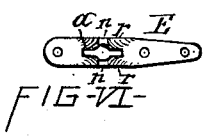
FIG-VI-
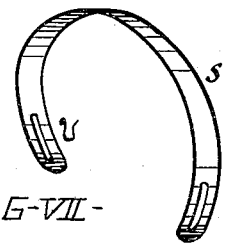
FIG-VII-
WITNESSES
C. Bendixon
Cow E. Raymond
INVENTOR
Miles E. Burlingame
per Hull, Laass & Hey
his Attys

UNITED STATES PATENT OFFICE.

MILES E. BURLINGAME, OF WILLETT, NEW YORK.

FETTER FOR ANIMALS.

SPECIFICATION forming part of Letters Patent No. 298,551, dated May 13, 1884.

Application filed March 1, 1884. (No model.)

*To all whom it may concern:*

Be it known that I, MILES E. BURLINGAME, of Willett, in the county of Cortland, in the State of New York, have invented new and useful Improvements in Fetters for Animals, of which the following, taken in connection with the accompanying drawings, is a full, clear, and exact description.

This invention relates to a hobble for horses and cattle designed to be connected with the leg of the animal to limit the movement thereof, and thus prevent the animal from running or straying or jumping the fence of a pasture or other inclosure.

The invention consists in a novel construction of a shackle which is readily applied to the leg of the animal, and capable of being adjusted to properly fit thereto without danger of chafing the leg, all as hereinafter more fully described, and specifically set forth in the claims.

In the annexed drawings, Figure I is a plan view of my invention. Fig. II illustrates its application to a horse's leg. Fig. III is a sectional view of the shackle, taken parallel to the plane thereof. Fig. IV is a detached view of the coupling-bar of the shackle; and Figs. V, VI, and VII are detached views of the side plates and mainspring of the shackle.

Similar letters of reference indicate corresponding parts.

A represents a flexible band held in the shape of a bow by a bent spring-band, S, which is enveloped in an elastic facing or cover, r', of leather or other suitable material, and is provided in its ends with longitudinal slots v, for the purpose hereinafter explained. The ends of said bow are drawn toward each other by a coupling which is removable to allow the band to be clamped onto the animal's leg, the whole constituting the shackle of the hobble. In order to render said shackle durable and efficient in its operation, I form the aforesaid coupling of a metal bar, C, constructed with a central hub, c, a journal, d, on one end, and with a T-shaped head, b, on the opposite end.

To the exterior of the two ends of the bow A, I attach two plates, E and F, one of the attaching-rivets of each of which passes through the slot v of the spring-band S, the elongation of said slot allowing the ends of the spring-band to play longitudinally in the operation of applying the shackle to and removing it from the animal's leg. The plate F is provided with an eye, f, in which is entered the journal d of the coupling-bar C, the end of the latter protruding at the exterior of the plate F, and being upset, as shown at g, to form a swivel-connection between said parts. The plate E is provided with a longitudinal slot, a, and with ribs r r at opposite sides of said slot, in which ribs are transverse notches n n, situated about midway the length of the slot a. Said slot is of such dimensions as to allow the T-head of the coupling-bar to pass through it. By giving said bar a quarter-turn the T-head thereof drops into the notches n n, and thus locks the coupling-bar in its position. In order to retain the T-head b in its engagement with the notches n n, I interpose between the hub c and adjacent sides of the bow A a spring, G, preferably in the form of a piece of rubber tubing slipped over the end of the coupling-bar, said spring (being assisted by the action of the spring-band S) serving to press the end of the bow A outward and hold the notched portion of the plate E against the T-head b, and in case the spring G should from any cause fail to operate temporarily the spring-band S would still hold the notched portion of the plate E against the T-head b, thereby preventing an undesigned uncoupling of the shackle.

To the journaled end of the coupling-bar C, between the hub c and adjacent inner side of the bow A, I apply washers w, preferably of leather, to obviate the danger of chafing the horse, said washers forming a cushioned end bearing for the hub c. In an eye of the hub c is swiveled a hook or eye, e, for the connection therewith of a chain, l, the opposite end of which may be connected either to the headstall of a halter or straps on the animal's head, to a so-called "poke" on its neck, to a ring inserted in the animal's nose or attached to its horns, or to a so-called "clog" to be drawn upon the ground, or to a picket, pin, or stake driven in the earth, or to another similar shackle attached to another of the animal's legs, or to the leg of another animal, thereby coupling the two animals together.

Having thus described my invention, what I claim is—

1. The improved shackle consisting, essentially, of a bowed spring-band, an elastic facing or cover applied to said band, and the removable coupling for drawing the ends of the bow toward each other, substantially as set forth.

2. The combination, with the flexible bow A, of the plates E F, the coupling-bar C, swiveled on one of said plates and detachably connected with the other plate, and a hobble connected with said coupling-bar, substantially as set forth.

3. In combination with the bow A, the plate E, provided with the longitudinal slot $a$ and transverse notches $n$, and the coupling-bar C, formed with the T end $b$, substantially as shown and described.

4. In combination with the bow A, the plate E, provided with the slot $a$ and transverse notches $n$, the coupling-bar C, having a T end, $b$, and central hub, $c$, and a spring interposed between said hub and adjacent side of the bow, substantially as described and shown.

5. In combination with the bow A, the plates E F, secured to the exterior of the ends of the bow, the coupling-bar C, swiveled on the plate F, and detachably connected with the plate E, and formed with a central hub, $c$, a hook or eye, $e$, swiveled on the hub, and a spring, G, interposed between the hub and adjacent side of the bow, substantially as described and shown.

6. In combination with the bow A, the plate F, provided with the eye $f$, the plate E, provided with the slot $a$ and transverse notches $n$, the coupling-bar C, formed with the central hub, $c$, journal $d$, entering the eye of plate F and terminating with the upsetting end $g$, and T end $b$, engaging the plate E, and the adjusting-washers $w$ and spring G, respectively at opposite ends of the hub, and a hook or eye, $e$, connected with the hub, all constructed and combined substantially in the manner shown and set forth.

In testimony whereof I have hereunto signed my name and affixed my seal, in the presence of two attesting witnesses, at Willett, in the county of Cortland, in the State of New York, this 21st day of February, 1884.

MILES E. BURLINGAME. [L. S.]

Witnesses:
JAMES A. SEEBER,
JOSEPH M. TENNANT.